United States Patent [19]

Weible

[11] 4,310,206
[45] Jan. 12, 1982

[54] UNIVERSAL JOINT WITH LUBRICATING MEANS

[75] Inventor: Warren W. Weible, Defiance, Ohio

[73] Assignee: The Zeller Corporation, Defiance, Ohio

[21] Appl. No.: 190,427

[22] Filed: Sep. 24, 1980

Related U.S. Application Data

[63] Continuation of Ser. No. 27,243, Apr. 5, 1979, abandoned.

[51] Int. Cl.³ .................... F16C 33/66; F16D 3/26
[52] U.S. Cl. .................................... 308/187; 64/17 A; 184/105 B
[58] Field of Search ............... 308/78, 106, 187, 208, 308/212; 64/17 R, 17 A; 184/88 R, 105 B; 403/57

[56] References Cited

U.S. PATENT DOCUMENTS

| | | | |
|---|---|---|---|
| 1,393,097 | 10/1921 | Dupre | 184/105 B |
| 1,731,803 | 10/1929 | Wedeberg | 184/105 B |
| 1,823,618 | 9/1931 | Magnuson | 184/105 B |
| 2,922,435 | 1/1960 | Edwards | 184/105 B |
| 3,726,577 | 4/1973 | Faulbecker | 308/212 |

FOREIGN PATENT DOCUMENTS

| | | | |
|---|---|---|---|
| 793194 | 1/1936 | France | 184/105 B |
| 691079 | 5/1953 | United Kingdom | 64/17 A |

Primary Examiner—Richard R. Stearns
Attorney, Agent, or Firm—Allen D. Gutchess, Jr.

[57] ABSTRACT

A universal joint with lubricating means is provided. Heretofore, universal joints with lubricating provisions have had central lubricating fittings in the cross, with the fittings communicating with the bearing cups through lubricating passages in the cross body and trunnions. The lubricating passages reduce the cross section of the trunnions which have broken at the base in certain heavy duty applications. The new universal joint has lubricant fittings in the bearing cups and eliminates the lubricating passages in the cross. Each bearing cup has an opening with an outer surface contoured to receive the nozzle of a lubricating gun or tool. A one-way valve is located at the inner surface of the bearing cup which allows lubricant to enter the cup through the opening and keeps out contaminants.

8 Claims, 6 Drawing Figures

UNIVERSAL JOINT WITH LUBRICATING MEANS

This is a continuation of application Ser. No. 27,243 filed Apr. 5, 1979, and now abandoned.

This invention relates to a universal joint with lubricating means provided in the bearing cups.

Universal joints for most vehicles other than passenger cars heretofore have had lubricating provisions for the trunnion bearings and bearing cups. Usually, this has been accomplished through a lubricant fitting provided in the body of the cross with the fitting communicating with the bearing cups through passages extending through the cross body and the trunnions. The lubricant passages reduce the cross-sectional area of the trunnions, tending to weaken them. In some applications involving high stress, the trunnions have broken near the bases at the body of the cross. For example, this has tended to occur in universal joints employed in the front drive trains of four-wheel drive vehicles. Some bearing cups have been drilled for conventional Zerk fittings with spring-loaded ball check valves. However, these take considerable space and can interfer with ball joints or other adjacent components.

The present invention provides a universal joint with lubricating means which eliminates the lubricating passages in the cross body and trunnions. In accordance with the invention, each bearing cup has a central opening therein extending from the outer surface to the inner surface. The outer surface around the opening is contoured to receive a nozzle of a lubricating tool or gun. The contour of the outer surface can be similar to but shorter than a conventional Zerk fitting. However, particularly where space is limited, the contour can be even much shorter than a Zerk fitting or even recessed.

A one-way valve is located at the inner surface of the cup and has a portion aligned with the opening. The valve is contiguous with the inner surface but when grease is supplied, the pressure forces the valve portion away from the inner surface to enable lubricant to enter. Any pressure in the cup, however, forces the valve against the inner surface to prevent lubricant from leaking outwardly through the opening and contaminants from entering. In a preferred form, the valve is located in a shallow recess in the cup around the opening and held therein by staking or by a press fit. In a preferred form, the valve can either be star-shaped or have a C-shaped slot forming a flapper aligned with the cup opening.

It is, therefore, a principal object of the invention to provide a stronger universal joint with lubricating means.

Another object of the invention is to provide a universal joint with lubricating means in the bearing cups.

Yet another object of the invention is to provide a universal joint with grease fittings in the bearing cups and thin one-way valves within the cups.

Many other objects and advantages of the invention will be apparent from the following detailed description of preferred embodiments thereof, reference being made to the accompanying drawings, in which.

Figure 1:
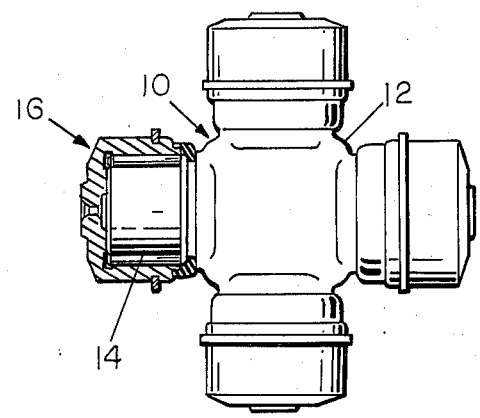
FIG. 1 is a view in elevation, with a part in cross section, of a cross and bearing cups of a universal joint in accordance with the invention.
Figure 2:
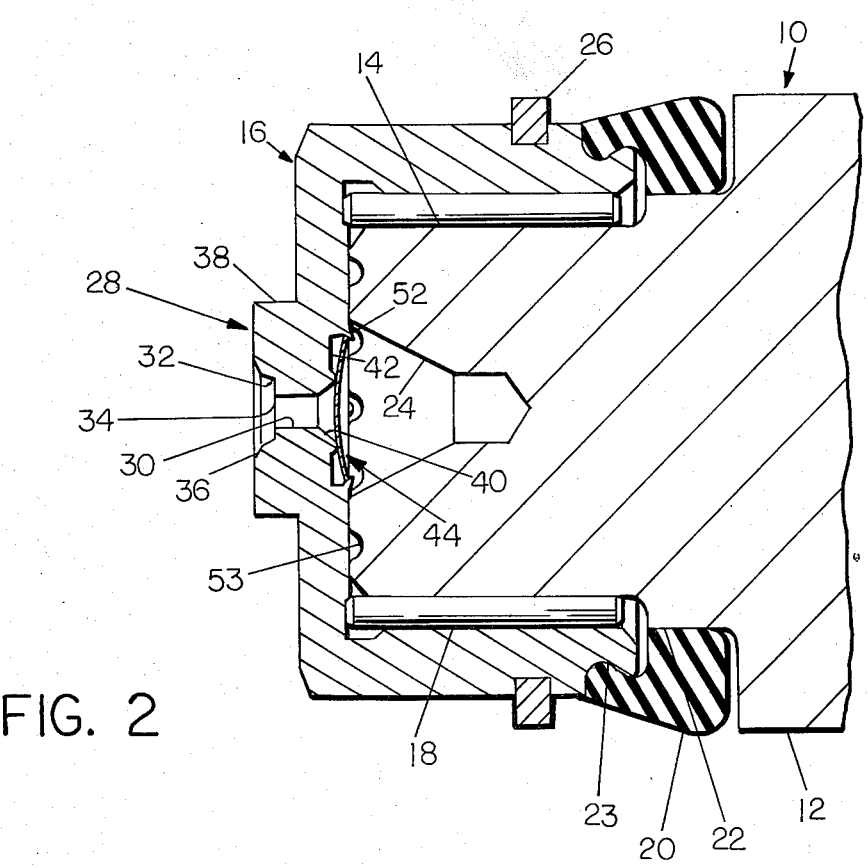
FIG. 2 is an enlarged, fragmentary view of the cross and one bearing cup of FIG. 1.

Referring to the drawings, and particularly to FIGS. 1 and 2, a cross 10 of a universal joint includes a main body 12 and four trunnions 14. Each trunnion is received in a bearing cup 16 with usual needle bearings 18 located between the surface of the trunnion and the inside wall of the bearing cup 16. An annular lubricant seal 20 is located on a shoulder 22 of the cross and is engaged in an annular groove 23 of the cup 16. A recess 24 in the end of the trunnion 14 is only for manufacturing purposes.

A snap ring 26 retains the cup 16 in a yoke (not shown) of a universal joint. When the cross 10 and the bearing cup 16 are used in a double Cardan universal joint, two crosses are employed. Two opposite bearing cups of one cross are held by an end yoke and the other two bearing cups of that cross are held by a connecting yoke. Similarly, two bearing cups of the second cross are held by a second end yoke and the other two bearing cups of that cross are held by the connecting yoke. The components discussed to this point are known and conventional in the art.

Heretofore, with lubricating provisions for a universal joint, a passage usually extended completely through each of the trunnions 14 to each of the bearing cups 16 and also to a central portion of the cross body 12 where a lubricant fitting was located. This passage reduced the cross-sectional area of the trunnion 14, causing it to break at the cross body 12 and specifically near the shoulder 22, under high stress conditions. A common such condition occured where the cross 10 was employed in a universal joint in the front wheel drive train of a four-wheel drive vehicle.

By employing lubricating means indicated at 28 in the bearing cup 16, lubricant can be supplied to the interior of the cup without requiring a passage through the trunnion 14. The lubricating means 28 includes a lubricating passage or opening 30 located centrally in the cup and extending from the outer surface to the inner surface thereof. The outer surface around the opening 30 is contoured to receive a nozzle of a lubricating tool or gun. In this instance, a shallow, generally truncated conical recess 32 extends from an annular shoulder 34 around the opening 30 and terminates in a further flared surface 36. The recess is located in a short cylindrical projection 38 which provides sufficient thickness for the end wall of the cup.

The lubricating opening 30 terminates at its inner end in a flared surface 40 which opens into a shallow recess 42 at the inner surface of the bearing cup 16. The recess 42 has a short, cylindrical outer wall which is concentric with the lubricating opening 30.

Figure 4:
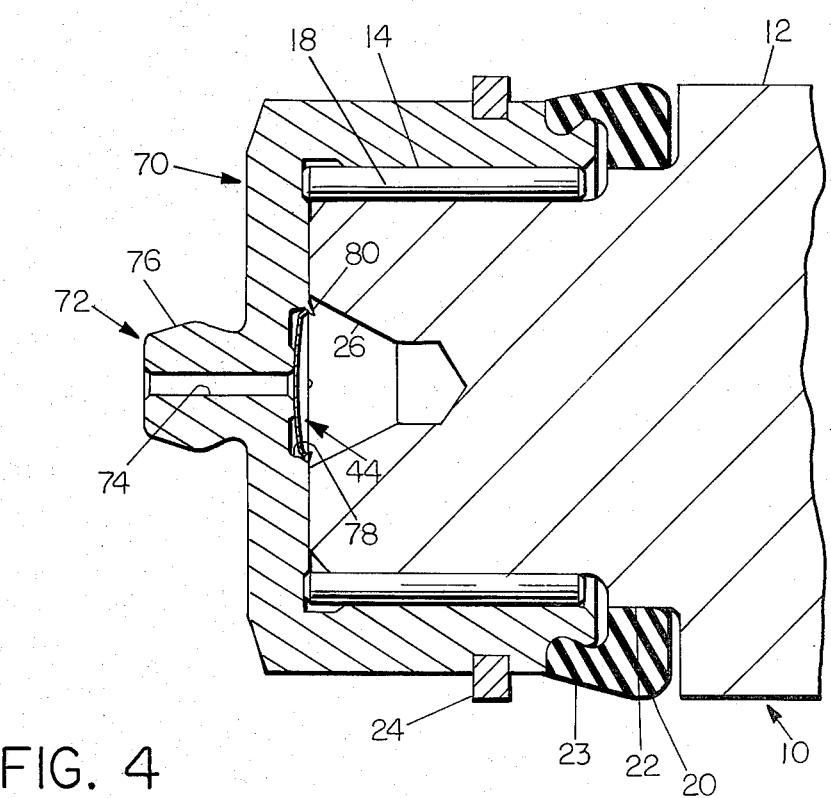
FIG. 4 is a view similar to FIG. 2 of the cross and a further modified bearing cup.
Figure 5:
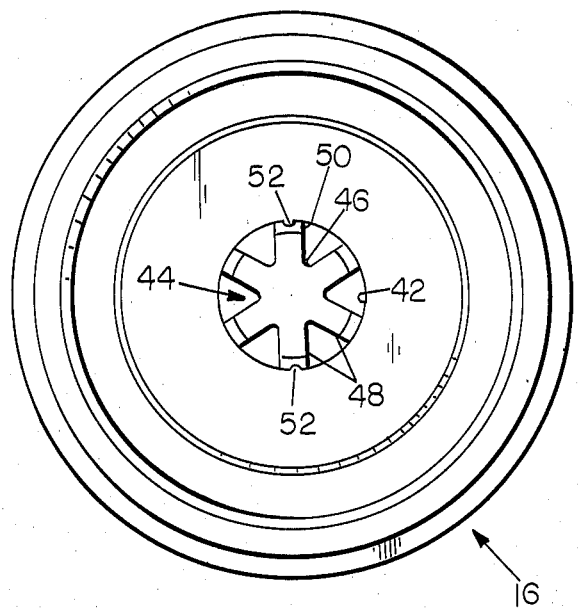
FIG. 5 is an end view in elevation taken from the open end of the bearing cup of FIG. 2, 3, or 4.

Referring also to FIG. 5, a thin, one-way valve 44 is positioned in the recess 42. The valve 44 is of generally star-shaped configuration with a central position 46 and radially-outwardly extending legs 48. The legs 48 have outwardly-curved ends 50 over which portions of the wall of the recess 42 are staked at 52 to mechanically hold the valve 44 in the recess 42. However, a press fit or other means could also be employed. The curved portions 50 of the legs 48 thereby hold the central portion 46 of the valve against the inner surface of the bearing cup 16 around the opening 30. When lubricant under pressure is supplied through the opening 30, it bears against the portion 46 of the valve exposed at the flared surface 40. Since this area is relatively large, the lubricant will force the valve portion 46 away from the inner surface of the bearing cup and enable the lubricant to move between the legs 48 and into the end of the bearing cup, from which it can move past the needle bearings 14 to the seal 20. If desired grooves 53 can be formed in the end surface of the trunnion 14 to facilitate this movement of the lubricant. The grooves can be parallel, as shown, or extend radially. These can also be equally well incorporated into the embodiments of FIGS. 3 and 4. If desired, the grease can be forced out around the seal 20 to assure a fresh supply of lubricant around the bearings.

Because the lubricant need not be under high pressure, there is little problem with leaking of the lubricant at the recess 32 when the nozzle of the lubricating tool is pressed thereagainst to supply lubricant through the opening 30. At the same time, with the short cylindrical projection 38, the lubricating means 28 can be used where little extra space is available around the universal joint, which is often the case with double Cardan joints employed in front wheel drives.

Figure 3:
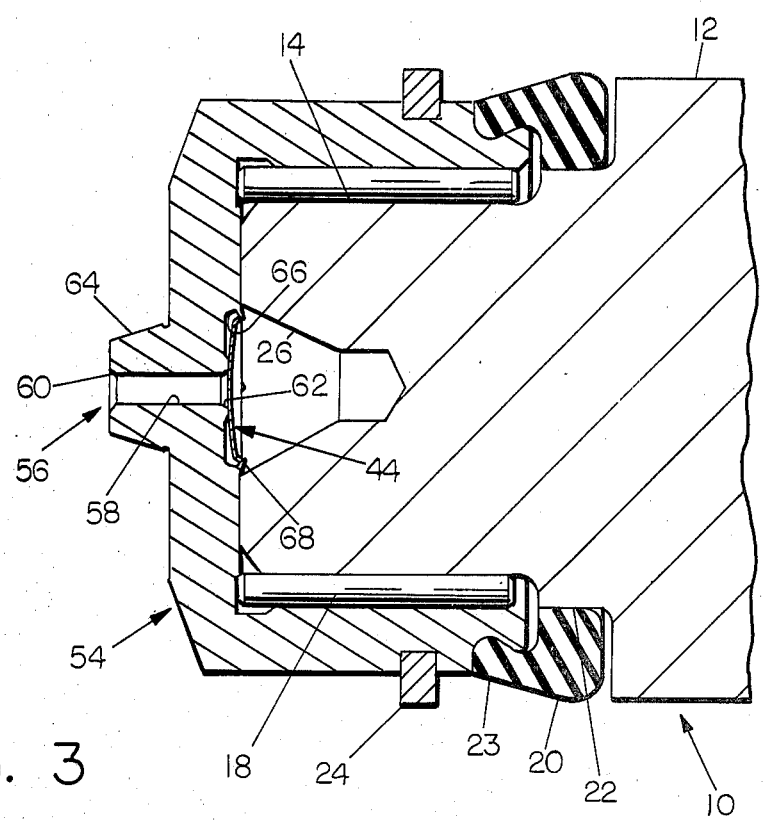
FIG. 3 is a view similar to FIG. 2 of the cross and a modified bearing cup.

Referring to FIG. 3, the universal joint cross 10 is shown with a modified bearing cup 54. The cup 54 is essentially similar to the bearing cup 16 except having different lubricating means indicated at 56. The lubricating means 56 has a lubricating passage or opening 58 extending from an outer surface of the cup 54 to an inner surface, and specifically terminating in short flared surfaces 60 and 62. The outer surface of the bearing around the opening 58 has a contoured projection 64 which, in this instance, is shaped similarly to a short Zerk fitting to receive a nozzle of a lubricating tool or gun. Unlike a conventional Zerk fitting, however, the lubricating tool must be held firmly against the projection 64 when supplying lubricant. The projection 64 takes up minimal extra room and is advantagous when space around the universal joint is limited.

At the inner surface of the bearing cup 54 is a shallow cylindrical recess 66 which is similar to the recess 42 and in which the one-way valve 44 can be located, being staked at 68. Again, the one-way valve 44 will open away from the inner surface from the bearing cup under relatively low pressure to enable lubricant to enter. At the same time, it is effective to prevent contaminants from entering and lubricant from leaking out.

Referring to FIG. 4, the cross 10 is shown with a slightly modified bearing cup 70 similar to the bearing cups 16 and 54 but with a slightly modified lubricating means 72. In this instance, a passage or opening 74 extends from the outer surface of the bearing cup 70 to the inner surface with flaring ends similar to those in FIG. 3. However, the outer surface around the opening 74 is contoured in a projection 76 shaped similar to a Zerk fitting but shorter since there is no spring-loaded ball check valve to contend with. The one-way valve 44 can be located at the inner surface, in a shallow recess 78 and staked at 80.

Figure 6:
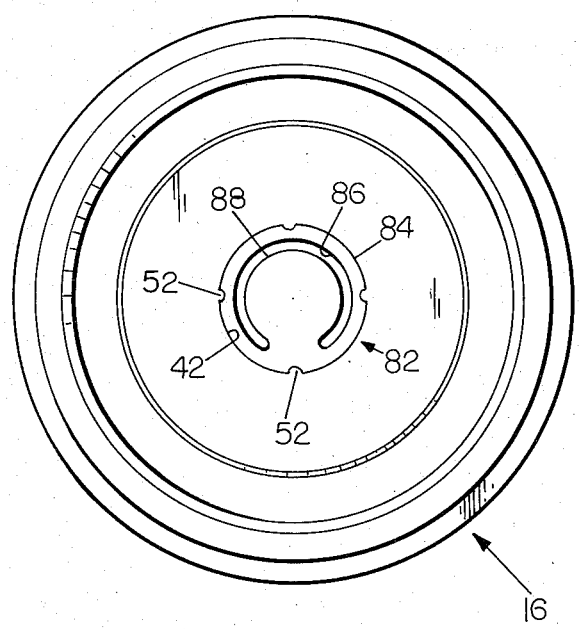
FIG. 6 is a view similar to FIG. 5 of the bearing cup with a modified one-way valve therein.

Referring to FIG. 6 a modified one-way valve 82 can be employed in place of the valve 44 in any of the bearing cups, the bearing cup 16 being shown in this instance. The valve 82 includes a disc-like member 84 having a C-shaped slot 86 forming a central flapper portion 88. The portion 88 is aligned with the lubrication opening 30 of the bearing cup and opens when lubricant under pressure is supplied therethrough. Otherwise, the flapper 88 is contiguous with the inner surface of the cup, being held in the recess 42 by the stakes 52. The flapper portion 88 also opens relatively easily, with a relatively large area being exposed to the lubricant, due to the flared inner end of the lubricant opening 30.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A cross and bearing cup combination for a universal joint, said cross having a trunnion, said bearing cup being positioned around said trunnion and having a central opening extending therethrough, said cup having a recess at the outer surface thereof concentric with said opening and being contoured to receive and closely fit with a nozzle of a lubricating tool, said bearing cup having a central, short cylindrical projection on the outer surface in which said recess is located, and a valve carried by said cup at the inner surface around said opening and having a portion aligned with said opening, said portion being effective to move away from the inner surface when lubricant under pressure is supplied through said opening from the outer surface to enable lubricant to enter the cup through said opening.

2. A cross and bearing cup combination according to claim 1 characterized by the outer surface of said cup around said opening being recessed.

3. A cross and bearing cup combination according to claim 1 characterized by said outer surface of said bearing cup around said central opening being a projection.

4. A cross and bearing cup combination according to claim 3 characterized by said projection being contoured similarly to a Zerk fitting.

5. A cross and bearing cup combination for a universal joint, said cross having a trunnion with a solid cross section at its base, said bearing cup being positioned around said trunnion and having a central opening extending therethrough, an outer, structurally integral, central portion of said cup at said opening having an outer surface which is contoured to receive and closely fit with a nozzle of a lubricating tool, said cup having a shallow recess on the inner surface thereof concentric with said opening, and a valve located in said recess and having a valve portion aligned with said opening, edges of said valve being engaged by staked portions of a peripheral wall of the recess, said valve portion being effective to move away from the inner surface when lubricant under pressure is supplied through said opening from the outer surface to enable lubricant to enter the cup through said opening.

6. A cross and bearing cup combination for a universal joint, said cross having a trunnion with a solid cross section at its base, said bearing cup being positioned around said trunnion and having a central passage extending therethrough, with the outer surface of said bearing cup at the outer end of said passage having a recess with a truncated conical surface and an outer flared surface which are contoured to receive and closely fit with a nozzle of a lubricating tool, and a valve carried by said cup at the inner surface around said passage and having a portion aligned with said passage, said passage having an outwardly flaring surfce at its inner end communicating with said portion whereby said portion moves away from the inner surface when lubricant under pressure is supplied through said passage from the outer surface to enable lubricant to enter the cup through said passage.

7. A cross and bearing cup combination according to claim 6 characterized by said cup having a shallow recess on the inner surface thereof concentric with the outwardly flaring surface at the inner end of said passage, said valve being affixed in said shallow recess with the aid of the side walls of the shallow recess.

8. The combination according to claim 6 characterized by said opening flaring outwardly at its inner end in communication with said portion to enable said portion to move away from the inner surface of the cup at lower pressure than otherwise.

* * * * *